United States Patent

[11] 3,577,598

| [72] | Inventor | Eric Schwarz<br>9 Hochstrasse 8044, Zurich, Switzerland |
| --- | --- | --- |
| [21] | Appl. No. | 775,411 |
| [22] | Filed | Nov. 13, 1968 |
| [45] | Patented | May 4, 1971 |
| [32] | Priority | Nov. 17, 1967 |
| [33] | | Austria |
| [31] | | 10373/67 |

[54] APPARATUS FOR THE AUTOMATIC DETERMINATION OF FIBER LENGTH DISTRIBUTION OF A FIBER POPULATION
9 Claims, 4 Drawing Figs.

| [52] | U.S. Cl. | 19/65, 19/115, 73/424, 356/167 |
| --- | --- | --- |
| [51] | Int. Cl. | D01h 19/00 |
| [50] | Field of Search | 19/65, 115; 356/167; 73/424 |

[56] References Cited
UNITED STATES PATENTS

| 2,299,983 | 10/1942 | Hertel | 356/167 |
| --- | --- | --- | --- |
| 2,845,837 | 8/1945 | Lord | 356/167 |
| 3,057,019 | 10/1962 | Hertel | 19/65 |

Primary Examiner—Dorsey Newton
Attorney—Cushman, Darby & Cushman

ABSTRACT: A drum containing fibers has a perforated wall portion swept exteriorly by a comb which picks up protruding fibers and forms a beard. Carding means on a successive wall portion is swept by the comb to parallelize the fibers in the beard. The comb sweeps past another successive wall portion where the beard is scanned optically to develop electric signals which are a function of the fibers in the beard. The beard is removed as the comb sweeps past another successive wall portion. Whereupon the cycle can be repeated.

PATENTED MAY 4 1971 3,577,598
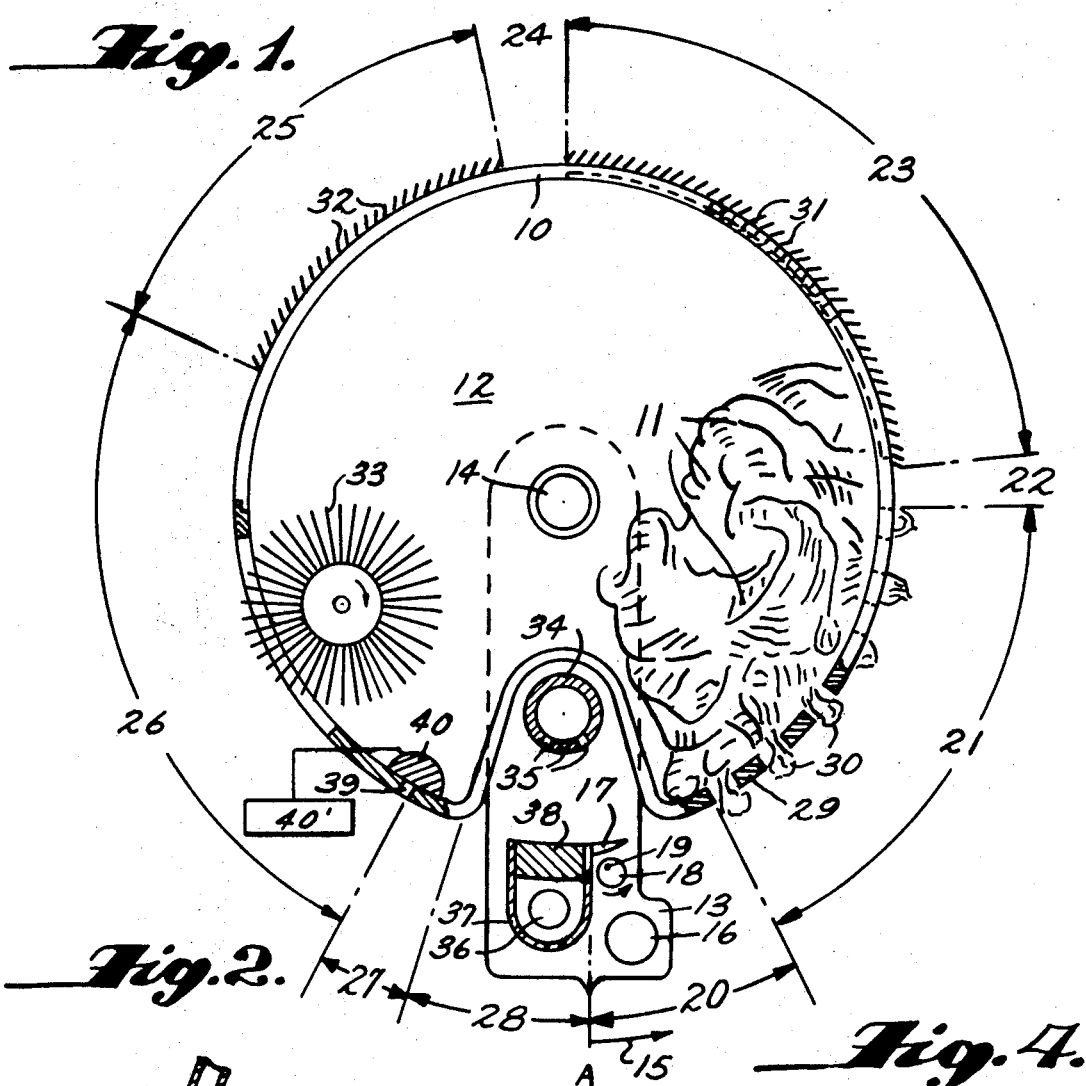
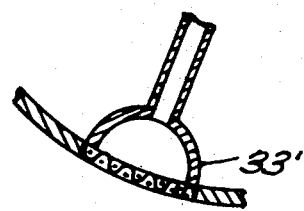
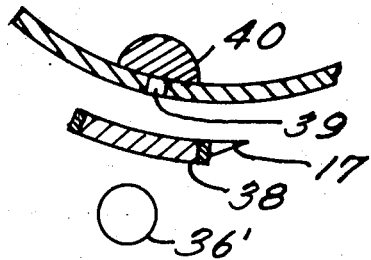
INVENTOR
ERIC SCHWARZ
BY Cushman, Darby & Cushman
ATTORNEYS

APPARATUS FOR THE AUTOMATIC DETERMINATION OF FIBER LENGTH DISTRIBUTION OF A FIBER POPULATION

DETAILED DESCRIPTION OF THE INVENTION

The invention cited herewith refers to an apparatus which will automatically determine the fiber length distribution of a fiber population, particularly of cotton. Such apparatuses are already known and are based on the optical scanning of a fiber sample (so-called fiber beard) taken from a to-be-tested fiber population and distributed in a predetermined manner along a comb. Then the fibers clamped by the comb, after being parallelized, are mounted on the traveling comb carrier of an automatic testing instrument and passed slowly under the length of an elongated light beam at a constant rate of speed. On the side of the fiber beard opposite the light slit, there is a photocell which determines the amount of light that will pass through the fiber beard. The amount of light absorption by the fiber beard at any point serves as a direct indication of the number of fibers at that point. This number of fibers is registered as a function of the distance advanced by the comb carrier and permits an indication of the fiber length distribution of a respective fiber beard, depending upon the status of technology, through graphic or digital methods (See MELIAND-TEXTILBERICHTE 6/1964, Seite 603 bis 608).

To appropriately determine a fiber length distribution, it is necessary, therefore, to prepare representative fiber beards. Formerly, such fiber beards were prepared by handcombing the to-be-tested fiber population with a suitable comb on which the fibers were caught, and then by means of brushes or still other combs, parallelized; this preparation of fiber beards was found to be unsatisfactory and did not furnish test results representative of the to-be-tested fiber population. Methods to improve the preparation of such fiber beards have already been made (U.S. Pat. No. 3,057,019) by means of which bunches of the to-be-tested fiber population are put inside a stationary drum in such a way that a number of tufts extend through the perforations of the drum shell. A comb, extending in an axial direction along the circumference of the drum shell, can be revolved around the shell, first passing over the section containing the perforations, for the purpose of combing out a multiple number of fibers from the protruding tufts. These combed out fibers are held in the comb by a clamping device. Continuing the revolving motion, the comb passes over a section of the drum shell provided with a card, which serves to parallelize the fibers caught in the comb. The comb, with the so prepared clamped fiber beard, is removed from the drum, then brushed by hand, or otherwise treated, in order to remove any or all foreign matter, including short fibers not caught by the comb, and then finally mounted on the comb carrier of the previously mentioned test instrument and tested.

Although fiber beards prepared in such manner furnish satisfactory and reproducible results with reference to the fiber length distribution of respective fiber populations, the handling of the apparatus preparing these fiber beards is unsatisfactory, since the entire test procedure, consisting of the preparation of the fiber beard, its further handling, the mounting of the comb on the test instrument and lastly, the carrying out of the test procedures, altogether requires a considerable amount of time. Since there are usually quite a number of fiber beards necessary to be tested from an unknown fiber population in order to determine the fiber length distribution, the need exists to improve the entire apparatus.

The purpose of the invention cited herewith is to provide such improvement of the apparatus automatically determining the fiber length distribution of a fiber population. The apparatus pursuant to invention consists, on the one hand, of a device for the preparation of the fiber beard distributed along a comb in a predetermined manner from a to-be-tested fiber bundle, which bundle is arranged in a stationary drum and from which fiber tufts extend through the perforated section of the drum shell, around which a comb, extending in an axial direction, can be revolved, thus first passing over the perforated drum section for the purpose of combing out a multiple number of fibers from the tufts, said comb being provided with a clamping device to catch the combed out fibers, and then by revolving further, travel by a section of the drum covered with a card suitable to parallelize the fibers caught in the comb. Further included in the apparatus is a testing instrument, which is so constructed that it pushes the fiber beard clamped to the comb in a direction parallel to the fiber lengths, at a predetermined speed through a light beam, and determines the amount of light passing through as a function of the distance advanced, converting the latter into electrical signals and evaluating the electrical signals in order to determine the fiber length distribution. The apparatus pursuant to invention is distinguished by the fact that the sections of the drum shell provided with perforations and a card which the comb passes over in a complete tearing action, represents only the first part of the drum shell. Thus, the comb with its clamped fiber beard, must travel over a second part of the drum shell on which there are points through which the fiber beard must pass in order to undergo further treatment, and then a position is reached where optical scanning of the fiber beard by means of a light beam moving with reference to the comb in the direction of the extension of the fibers and where the determination of the amount of light penetrating the fiber beard, in the form of electrical signals, depending upon this movement, takes place, whereupon, after loosening the clamping of the fibers in the comb, the tested fiber beard is removed and the apparatus is again ready for a repetition of the sampling and the testing of same.

The apparatus pursuant to invention is described hereafter by design examples in accordance with attached drawings in which:

FIG. 1 is a Schematic top view, partly in section, of apparatus embodying this invention.

FIG. 2 is a fragmentary view, corresponding to a portion of FIG. 1, illustrating a modified form of this invention.

FIG. 3 is a fragmentary view corresponding to a portion of FIG. 1, illustrating another modified form of this invention.

FIG. 4 is a fragmentary view, corresponding to a portion of FIG. 1, illustrating another modified form of this invention.

In the illustrated design example, the above cited open drum 10, is partially filled with a bunch 11 of the to-be-tested fiber population, possibly a cotton bunch. In the bottom end 12 of the drum 10 is a swinging arm 13, which revolves on its axis 14, and is so mounted that by using the handle 16, it can be revolved around the drum from the starting position A in the direction of the arrow 15. On swinging arm 13, a comb 17 is fixed, which serves for the preparation of the fiber beard. Contrary to the already known devices for the preparation of fiber beards by means of such a drum, the comb 17 here does not need to be detached from the swinging arm 13. Close to comb 17, on swinging arm 13, is a clamping device to clamp the combed-put fibers, which, for example, could consist of a cylindrical roller 18, which can be turned around eccentrically the length of the axis 19, which is itself fixed to the swinging arm 13.

In the event swinging arm 13, which can be arrested, is moved from starting position A in the direction of the arrow 15, then the comb 17, passes by in succession the angular sections 20, 21, 22, 23, 24, 25, 26, 27, and 28 of the drum shell and then again returns to starting position A. Whereby the comb 17 should not touch the surface of the drum, but pass closely to it at that distance which makes possible the formation of a fiber beard extending in a position contrary to the direction of the rotation of the comb. The drum shell at angular section 21 is provided with multiple perforations 29, protruding from which are the fiber tufts 30 from the fiber bundle 11 placed in the interior of the drum. From these fiber tufts 30, a great number of single fibers will be combed out by the teeth of comb 17, and will be caught inbetween the teeth of this same comb 17. When passing angular section 22, the clamp roller 18 will be turned in the direction of the arrow by means of a suitably constructed control component mounted on the drum shell i.e. it will press the back end of the teeth of comb 17 from above and thereby clamp the fibers caught inbetween its teeth. During the continuing further rotation of swinging arm 13, the clamp roller 18 will remain in this position, so that the combed out fibers, or at least most of them, will remain caught.

In angular section 23, comb 17 with its clamped fiber beard passes over a multiple number of cards 31, which cards, in a known manner, effect a parallelization of the moving fibers caught in comb 17, which are extending backwards counter to the direction of the rotation of arrow 15, whereby simultaneously the short fibers not firmly caught, fiber neps and foreign material are combed out of the fiber beard. During the passage through angular section 24, further measures can be taken to improve the homogeneity of the fiber beard i.e. the clamp roller 18 can be somewhat loosened temporarily and then tightly clamped again, in order to give single fibers the opportunity to be reorientated. In angular section 25, cards 32 are again provided which effect a further combing out and parallelization of the single fibers in the fiber beard.

Angular section 26 can serve to provide further handling stations which might be desired for the preparation of the fiber beard. For example, it is advantageous to mount a brush 33, rotating in the direction indicated by the arrow, by means of which an additional number of short fibers not clamped in the clamping device of the comb can be combed out, as well as to provide a general smoothing out of the fiber beard which is moving in the direction of arrow 15. If so desired, a vacuum suction device 33' (FIG. 2), in addition to or in lieu of brush 33, can be provided.

In passing through angular section 27, as shown in the illustrated design example of the apparatus, the optical scanning of the fiber beard which has been made up and prepared in the described manner, takes place, which procedure will be described in more detail below. Traveling over angular section 28, the swinging arm 13 finally regains starting position A. During this part of the revolving motion, the clamp roller 18 will be turned back again to the position as shown in the drawing, then the fibers caught inbetween the teeth of comb 17 loosened, and simultaneously air supplied through a tube 34 which, passing through nozzlelike holes 35, will form a radical outward airflow directed towards comb 17. In this manner therefore, by the time the swinging arm 13 regains its starting position, removal of the fiber beard clamped to comb 17 will have been effected by a blowing away, so that from starting point A on, the so-described operational cycle will begin again instantaneously i.e. a new fiber beard will be automatically prepared and tested. The disposal of the fiber beard, if desired, can also be achieved by a vacuum suction.

By means of the described device, it is therefore possible to prepare one fiber beard after another and in the same apparatus perform one test after the other to determine the fiber length distribution, without removing the fiber comb holding the prepared fiber beard from the drum and respectively taking it off the swinging arm and placing it on the testing instrument to test.

The determination of the fiber length distribution can be made by various means, each depending upon the construction and design of the respective optical components. According to the one in the design example as shown by the drawing, there is on swinging arm 13, close to the base of comb 17, an elongated light source 36 in an enclosure 37, as well as a transparent light plate 38, which may serve as a support for the fiber beard prepared on comb 17. Provision is made, in a known manner, for the light intensity at the outside surface of the transparent light plate 38 to be generally constant, so that the same amount of light prevails at any points on the fiber beard clamped to comb 17. As soon as swinging arm 13, with the fiber beard lying on it, passes over the slit 39 in the drum shell extending parallel to its axis 14, behind which slit, a light conductor or photoelectric cell 40 is provided. This light conductor is connected to a receiving device 40' which converts the amount of light penetrating slit 39 to a proportionate electrical signal. During the passage of the fiber beard clamped to comb 17 over slit 39, i.e. by the passing of swinging arm 13 over angular section 27, a light beam, depending upon that amount of light absorbed by the fiber beard in the corresponding angular section, will enter the light conductor 40. The electrical signal emitted by the receiver of the light conductor will be in direct proportion to the number of fibers in the fiber beard in accordance with the individual angular points that swinging arm 13 passes in succession in angular section 27.

The electrical signal emitted by the receiver 40' of the light conductor 40 will be transmitted, jointly with a second signal corresponding to the angular position of swinging arm 13 in angular section 27, by means of electrical wiring, to a usual evaluating device, which, according to desire, will either draw the so-called Fibrogram of the fiber lengths, depending upon the number of fibers (in percent weight), or indicate directly from the corresponding values of both electrical signals, through electronic calculations the desired specific digital values pertaining to the tested fiber beard.

It is easily possible in a design example in the described manner to completely automate the movement of swinging arm 13 and to have it undergo a steady revolving motion from its departure point at starting position A as far as the beginning of angular section 27. In the latter angular section, the rotating speed would then be expediently reduced and the revolving motion taken over by a device capable of transmitting an electrical signal in proportion to the angular position to the evaluating instrument. Naturally, there would also have to be corresponding control components on the drum shell which would not only effect, as in angular section 22, a rotation of the clamp roller, but especially when reaching and passing over angular section 27, the triggering of the electrical signals necessary for the evaluation of the optical scanning of the fiber beard.

The above-described optical-electrical fixture to test the fiber beard can also be equipped with a stationary light source 36' (FIG. 3) which, within a certain radial distance above slit 39, can be arranged in such a manner that the fiber beard clamped to comb 17 can freely pass through the gap between the light source 36' and the slit 39. In that event, the light source 36 and its enclosure 37, can be omitted.

If desired, in lieu of the light conductor 40, a respective light source 36'' (FIG. 4) can be installed in the interior of the drum 10 along the slit 39. Then the enclosure 37 and light source 36 mounted on the swinging arm 13 are omitted, a light conductor 40' which must be connected to a respective receiving device (not shown) is mounted in a stationary position at a certain radial distance from slit 39, and the fiber beard clamped to comb 17 able to pass freely through the gap between the slit 39 and the light conductor 40'.

Naturally, the above described apparatus, in accordance with the drawing, illustrates only one of many possible design examples. Any layout can be set up which incorporates a drum whose section of the shell provided with perforations and cards is only the first part to be passed over during the complete revolving cycle of the comb, so that in a second part of the to-be-passed over shell section, the comb, with its fiber beard, will pass all the further stations required for preparation of the fiber beard Next, the so-prepared fiber beard must reach a position where its optical scanning will occur by means of a light beam moving with respect to the comb in the direction of the extension of the fibers, so that the amount of light penetrating through the fiber beard can be determined in the form of an electrical signal as a function of this movement. Finally, the loosening of the clamped fibers in the comb becomes necessary so that the fiber beard can be disposed of and the apparatus made ready for a repetition of the sampling of the fiber beard and its testing. Thereby, it is most expedient, as described in the above design example, to have the drum fixed in a stationary position and the comb with the fiber beard revolve around it; design examples are nevertheless possible where, to the contrary, the drum shell will be turned in relation to a stationary comb. The drum described above must not necessarily be of cylindrical shape, but can also, if desired, by executed in an oval, or rectangular form, where two half circle shells form the opposite ends; in such case, the comb will be respectively guided by a rail mounted on the outside of the drum.

I claim:

1. Apparatus for the determination of the fiber length distribution of a fiber population comprising:

a drum having arranged successively thereabout a plurality of sidewall portions, one of which is provided with a plurality of apertures for protrusion outwardly therethrough of fibers placed in said drum;

an elongated fiber collecting comb;

mounting means for said drum and comb to provide relative sweeping motion between said comb and the outer surface of said wall portions so that said comb will contact and gather fibers protruding outwardly through said apertures to form a fiber beard trailing said comb;

releasable clamp means for holding the beard to said comb;

carding means mounted on one of said wall portions beyond said one wall portion in position to comb and parallelize the fiber beard gathered by said comb;

means associated with a wall portion of said drum at a location beyond said carding means for optically scanning the relatively moving fiber beard; and means connected to said scanning means for developing electrical signals which are a function of the fibers in said beard.

2. The apparatus defined in claim 1 including means associated with the drum at a location between the scanning means and the apertured wall portion for removing the beard from the comb when the clam means is released.

3. The apparatus defined in claim 2 in which the removing means comprises blowing means for blowing the fibers of the beard away from the comb.

4. The apparatus defined in claim 1 in which the optical scanning means includes means for directing a light beam through the fiber beard and through a slit in the drum which extends normal to the direction of the relative movement.

5. The apparatus defined in claim 4 in which the optical scanning means includes a light conductor arranged along the slit on the interior of the drum for receiving the light beam.

6. The apparatus defined in claim 5 in which the optical scanning means includes a light source means mounted fixedly with respect to the comb and movable therewith relative to the drum for forming the light beam.

7. The apparatus defined in claim 5 in which the optical scanning means includes a light source means fixedly mounted with respect to the drum exteriorly of the slit for passage of the comb between said source means and said slit.

8. The apparatus defined in claim 1 including rotating brush means associated with the drum at a location between the carding means and the optical scanning means for brushing out the fibers of the beard.

9. The apparatus defined in claim 1 including suction means associated with the drum at a location between the carding means and the scanning means for cleaning the fiber beard.